United States Patent [19]
Combs

[11] 4,168,750
[45] Sep. 25, 1979

[54] AGRICULTURAL ROLLER

[76] Inventor: William M. Combs, 405 Senter Ave., Kerns, Tex. 75144

[21] Appl. No.: 723,744

[22] Filed: Sep. 16, 1976

[51] Int. Cl.² ............................................. A01B 29/02
[52] U.S. Cl. .................................... 172/311; 172/518; 172/519; 172/679; 280/456 R
[58] Field of Search ............... 172/310, 311, 679, 248, 172/519, 538, 539, 324, 326; 488/413, 412, 472, 456 R, 411 R, 411 A, 411 C

[56] References Cited

U.S. PATENT DOCUMENTS

| | | | |
|---|---|---|---|
| 1,843,110 | 2/1932 | Cooper | 172/538 X |
| 2,640,405 | 6/1953 | Wheeler | 172/310 |
| 3,367,678 | 2/1968 | Tonne | 280/411 A |
| 3,610,661 | 10/1971 | Pierce | 280/415 R |

FOREIGN PATENT DOCUMENTS

| | | | |
|---|---|---|---|
| 71004 | 1/1970 | German Democratic Rep. | 172/518 |
| 156109 | 9/1956 | Sweden | 172/519 |

Primary Examiner—Richard J. Johnson
Attorney, Agent, or Firm—Thomas L. Cantrell; Joseph H. Schley

[57] ABSTRACT

Disclosed is an agricultural roller useful, for example, in closing and packing furrows after they have been sowed by a seed drill. The roller includes a generally rectangular frame equipped with several roller mounting stations for mounting the desired number of pairs of rollers for a particular use in side-by-side alignment. The frame is also equipped with alternate towbar mounting stations and means for positioning the towbar appropiately for the number of roller pairs employed, and with mounting stations for outrigger frames carrying additional roller pairs when desired. The roller pairs are so mounted on the frame (and outriggers) that they are pivotable in a vertical plane transverse to the rolling direction to closely follow the land contour.

9 Claims, 6 Drawing Figures

AGRICULTURAL ROLLER

BACKGROUND OF THE INVENTION

This invention relates to agricultural rollers which are particularly suited for furrow closing, packing, and tamping and similar operations.

Many crops are sowed in rows by tractor mounted seed drills. After the rows are planted, it is desirable to close and pack the furrows immediately to protect the seed from birds, and from drying out or washing away, and to expedite the germination process. There is a variation from one planting situation to another in the number and spacing of the rows drilled at one time. In addition, there is a natural variation in the land contour of the fields being planted.

SUMMARY OF THE INVENTION

In accordance with the invention an agricultural roller is provided which is simple in construction and which meets the requirements outlined above fully. The roller of the invention may be towed behind the tractor and drill so that the furrows are closed and packed immediately after being planted.

The roller of the invention includes a generally rectangular main frame preferably constructed of welded pipe sections for simplicity and strength. Midway of the width of the frame and on its topside, a towbar mounting station is provided. A similar, alternate towbar mounting station is located at one end of the frame. At both ends of the frame, on its underside, are roller mounting stations. The main frame is also equipped at its ends with mounting means for outrigger frames, and in accordance with the invention, a generally rectangular outrigger frame may be mounted at either or both ends of the main frame, as is explained more fully below.

The roller elements of the invention are journalled in pairs at the ends of axles of appropriate length in view of the furrow spacing, and means are provided for detachably mounting the axles on the main frame or the outrigger frames at the roller mounting stations in a manner so that the axles may pivot on the frame in a generally vertical plane which is generally transverse to the direction of movement of the roller, so that the rollers may tilt with respect to the frame to accommodate unevenness in the contour of the land. Several configurations of roller element may be employed.

The generally rectangular outrigger frames have roller mounting stations at the outer ends thereof.

When it is desired to close and pack four side-by-side furrows, only the main frame of the unit is employed, and the towbar is mounted at the mid-frame or central towbar mounting station. A pair of roller elements is mounted at each end of the frame at the roller mounting stations. The towbar is then connected to the tractor.

If it is desired to close and pack six rows, the towbar is moved to the mounting station at the end of the main frame, and an outrigger frame is mounted at the same end of the main frame, with a pair of roller elements mounted at the ouer end of the outrigger frame.

When eight rows are to be packed, another outrigger frame is mounted at the other end of the main frame, with a pair of rollers mounted at its outer end.

From the foregoing it can be seen that a principal object of the invention is to provide a modular agricultural roller which may readily be converted to handle four, six, or eight rows.

Another object of the invention is to provide an agricultural roller of the multiple roller type which is capable of accommodating itself to variations in the contour of the ground.

A further object of the invention is the provision of an agricultural roller which is simple and sturdy in construction, which can be built in the main from standard pipe and steel plate, and in which only a small number of basic parts are involved.

The manner in which the foregoing objects and purposes, together with other objects and purposes are achieved in accordance with the invention may best be understood from a consideration of the detailed description which follows, together with the accompanying drawings.

DESCRIPTION OF THE PREFERRED EMBODIMENTS

Figure 1:
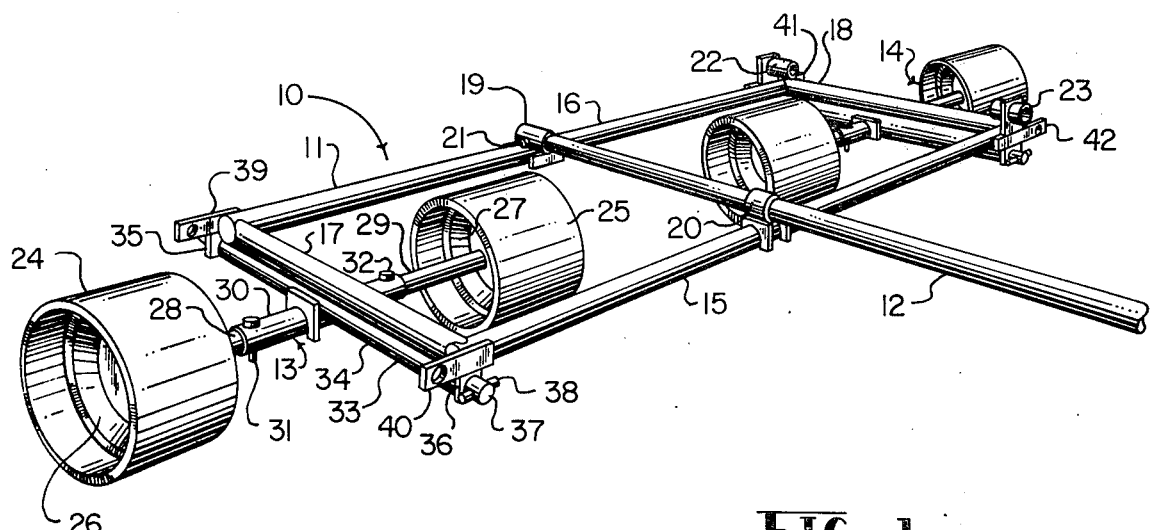
FIG. 1 is a perspective view of an agricultural roller constructed in accordance with the invention, with the device set up to handle four furrows.
Figure 2:
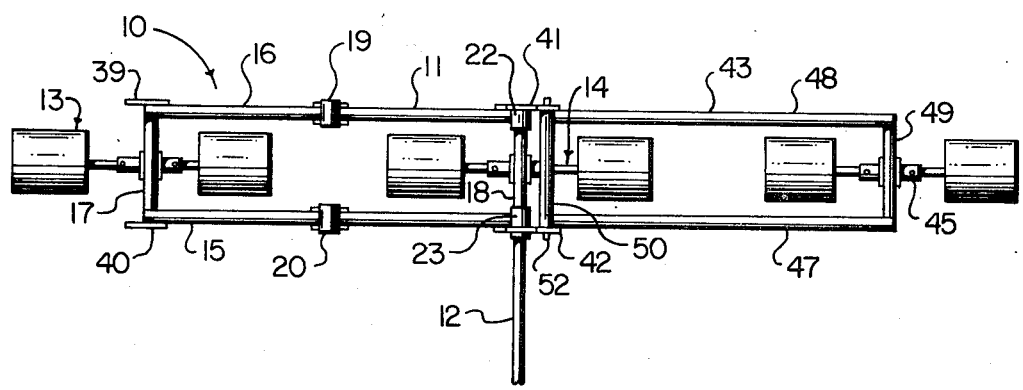
FIG. 2 is a plan view of the roller of FIG. 1, shown with an outrigger frame installed and the towbar relocated so that six furrows may be handled.
Figure 3:
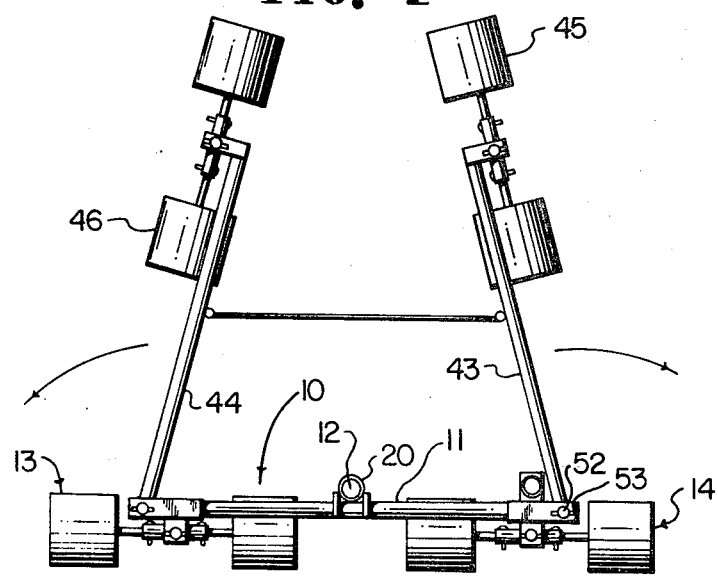
FIG. 3 is a front elevational view of the roller of FIG. 1, shown with two outrigger frames installed, for handling eight furrows, the outrigger frames being illustrated swung upwardly for road travel.

Attention is first directed to FIGS. 1-3, in which a preferred embodiment of the roller of the invention is designated generally as 10. Roller 10 includes a main frame 11, a towbar 12, and roller element pairs 13, 14.

Main frame 11 is preferably constructed of pipe sections welded together, and is generally rectangular in plan view. Thus it includes front rail 15 and rear rail 16, which are arranged parallel to each other, and end rails 17, 18 which are also parallel.

Two towbar mounting stations are provided on the topside of main frame 11. One is located substantially midway of the width of the frame, and preferably comprises collars 19, 20 which are attached to rear rail 16 and front rail 15, respectively. Collars 19, 20 are axially aligned and are oriented fore and aft of the unit. They are sized so that towbar 12 may be passed through front collar 20 and into rear collar 19, and secured there by locking pin 21. Towbar 12 is shown installed in the first or central mounting station in FIGS. 1 and 3.

The other towbar mounting station is located at the right end of main frame 11, in the unit of FIGS. 1-3, although it may be located at the left hand end if desired. It preferably comprises collars 22, 23 attached to rear rail 16 and front rail 15, respectively in fore-and-aft axial alignment. Towbar 12 is shown as installed in the second or end mounting station in FIG. 2.

In the embodiment of FIGS. 1-3, the roller element pairs 13 and 14 are identical in construction. Considering pair 13 in detail, it can be seen that it comprises roller shells 24, 25, each of which has a hub 26, 27 that may conveniently be a standard automotive wheel with built in antifriction bearings.

Hubs 26, 27 are journalled onto axles 28, 29, and are freely rotatable thereon. Each of the axles 28, 29 is telescoped into the opposite ends of axle tube 30, and held there by lock pins 31, 32.

Axle tube 30 is part of the roller element mounting means 33, which also includes mounting tube 34, attached to axle tube 30 at its midpoint, and at right angle thereto.

At each end of main frame 11 are mounting stations for the roller element pairs. Preferably these are in the form of apertured plates 35, 36 which depend from rails 16 and 15 respectively.

Roller element pair 13 is connected to the mounting station of main frame 11 by bringing mounting tube 34 of the mounting means 33 into axial alignment with the apertures in plates 35, 36, inserting rod 37 into the aligned parts and locking it at each end with lock pin 38. As a result of this mode of mounting, the axles and roller cylinders of roller pair 13 may rotate in a vertical plane which is transverse to the direction of movement of the roller to accommodate variations in ground contour. Stated differently, roller pair 13 is pivotable about rod 37.

The mode of mounting the other roller element pairs shown in FIGS. 1-3 is substantially as described above in connection with pair 13.

Outrigger mounting stations or means are provided at each end of main frame 11. These comprise pairs of aligned apertured plates 39, 40 and 41, 42 attached to main frame 11.

FIG. 2 shows a unit with one outrigger frame 43 attached to main frame, while FIG. 3 shows a unit with a second outrigger frame 44 attached. At the outer end of outrigger frame 43 is mounted roller pair 45 and at the outer end of outrigger frame 44 is its roller pair 46.

Outrigger frame 43 comprises front rail 47, rear rail 48, outer end rail 49, and inner end rail or tube 50. Tube 50 is welded to rails 47, 48, so that its hollow interior is exposed at both ends.

Outrigger frame 43 is attached to main frame 11 by aligning rail or tube 50 with the apertures in plates 41, 42, inserting rod 51 through the parts to connect them together, and locking it at both ends with lock pins 52 (see FIG. 3). Outrigger frame 44 is connected to main frame 11 in substantially the same manner, and is substantially the same in construction. The outrigger frames may pivot about rod 52, which provides an additional means of ground contour accommodation. It also makes it possible to swing the outriggers in and up, as shown in FIG. 3, for road travel.

Figure 4:
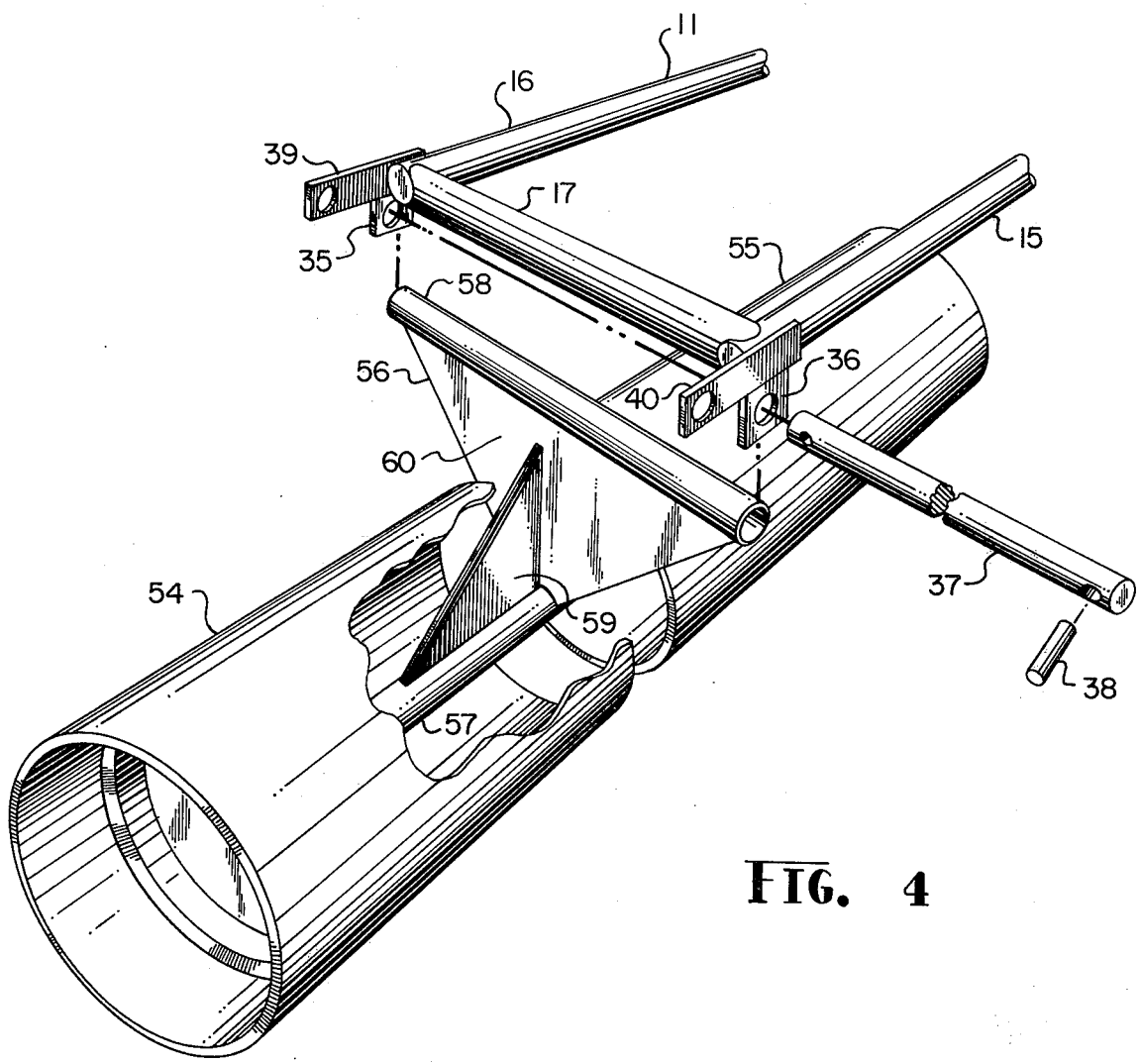
FIG. 4 is a fragmentary exploded perspective view on an enlarged scale of another embodiment of the invention having roller elements which are relatively larger in diameter and length than those of FIG. 1.
Figure 5:
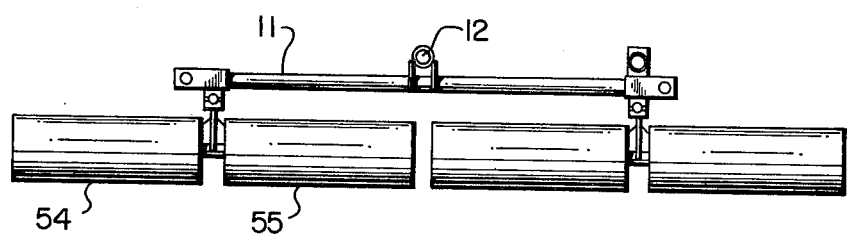
FIG. 5 is a front elevational view of the roller of FIG. 4.

Attention is now directed to FIGS. 4 and 5 which illustrate another embodiment having a modified pair of roller elements and a modified mounting means for attaching the roller pair to the main frame. The embodiment of FIGS. 4 and 5 differs from that of FIGS. 1-3 in that the roller cylinders are much longer than their counterparts in that embodiment, with the ends of the rollers closely approaching each other, within a very few inches, thereby providing for substantially continuous roller coverage of the ground across the full width of the roller. Furthermore, larger roller diameter is possible, since the roller is positioned entirely beneath the frame instead of partially within it. Compare FIGS. 3 and 5.

In FIGS. 4 and 5 parts identical in structure to parts discussed above in connection with FIGS. 1-3 are given the same number.

The roller element mounting means 56 includes axle tube 57, mounting tube 58 and intersecting gusset plates 59, 60. Plate 59 is coplanar with axle tube 57 and is attached thereto, preferably by welding. Plate 60 is coplanar with mounting tube 58, and is attached to it. Plates 59 and 60 intersect at right angles and are attached to each other. The shape and structure of plates 59, 60, enables the ends of roller cylinders 54, 55 to be brought closely adjacent, particularly the triangular shape of plate 59.

Figure 6:
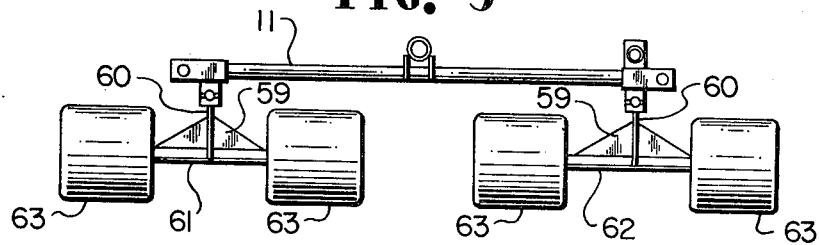
FIG. 6 is a front elevational view of another embodiment employing rubber-tired roller elements.

FIG. 6 illustrates a unit with rubber tired roller pairs 61, 62. The roller element mounting means are of the type described in connection with FIGS. 4 and 5. The tires 63 are preferably of the wide tread smooth surfaced type often used for racing car applications. If desired, they may be water filled to increase the packing pressure applied to the ground.

I claim:

1. An agricultural roller comprising:
   a generally rectangular main frame adapted to be towed in a direction transverse to a long side thereof;
   a towbar detachably connected to said main frame and extending transverse to a long side thereof;
   first towbar connecting means on said main frame, positioned substantially midway of a long side thereof;
   second towbar connecting means on said main frame, positioned at one end thereof;
   two pairs of roller elements detachably connected to said main frame, the roller elements in each of said pairs being axially aligned substantially parallel to a long side of said main frame; and
   connecting means for each of said pairs of roller elements, said connecting means comprising first connector elements affixed to the main frame at the ends thereof and second connector elements connected between the roller elements of a pair, said first and second connector elements being connected together in which said roller elements are mounted on axles, and in which said roller element connecting means comprise an axle tube telescopically engaging the axles of a pair of roller elements, a mounting tube, means connecting said tubes together in substantially perpendicular relationship, and means rotatably connecting said mounting tube to said main frame.

2. An agricultural roller in accordance with claim 1 and further comprising outrigger frame mounting means positioned at least at one end of said main frame.

3. An agricultural roller in accordance with claim 2 and further comprising an outrigger frame carrying a pair of axially aligned roller elements substantially aligned with the pairs of roller elements connected to said main frame, said outrigger frame being detachably connected to said outrigger frame mounting means.

4. An agricultural roller in accordance with claim 3 in which said outrigger frame is rotatably connected to said main frame to permit rotation of said outrigger frame with respect to said main frame in a vertical plane generally transverse to the towing direction of said roller.

5. An agricultural roller in accordance with claim 2 in which said outrigger mounting means are positioned at both ends of said frame and further comprising a pair of outrigger frames each carrying a pair of axially aligned roller elements substantially aligned with the pairs of roller elements connected to said main frame, said outrigger elements being detachably connected to said outrigger frame mounting means.

6. An agricultural roller in accordance with claim 5 in which both of said outrigger frames are rotatably connected to said main frame to permit rotation of each of said outrigger frames with respect to said main frame in a vertical plane generally transverse to the towing direction of said roller.

7. An agricultural roller in accordance with claim 1 in which said roller elements are open ended cylinders closely approaching each other endwise, and said tube connecting means comprise a pair of orthogonally oriented triangular plates at least one of which is partially disposed within an open end of a cylinder.

8. An agricultural roller in accordance with claim 1 in which said first and second connector elements are rotatably connected together to permit rotation of said pairs of roller elements with respect to said main frame in a vertical plane generally transverse to the towing direction of said roller.

9. An agricultural roller in accordance with claim 1 in which said roller elements comprise water fillable rubber tires.

* * * * *